United States Patent
Read

(10) Patent No.: US 7,839,844 B2
(45) Date of Patent: Nov. 23, 2010

(54) SYSTEM AND METHOD FOR DYNAMICALLY DETERMINING RETRANSMIT BUFFER TIME

(75) Inventor: Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1093 days.

(21) Appl. No.: 11/079,497

(22) Filed: Mar. 14, 2005

(65) Prior Publication Data

US 2006/0023710 A1 Feb. 2, 2006

Related U.S. Application Data

(63) Continuation-in-part of application No. 10/903,171, filed on Jul. 30, 2004.

(51) Int. Cl.
*H04L 12/56* (2006.01)

(52) U.S. Cl. .................................................... 370/389

(58) Field of Classification Search ............. 370/389, 370/498; 375/E7.278, E7.022
See application file for complete search history.

(56) References Cited

U.S. PATENT DOCUMENTS

| | | | |
|---|---|---|---|
| 5,179,557 A | 1/1993 | Kudo | 370/94.1 |
| 5,278,830 A | 1/1994 | Kudo | 370/94.1 |
| 5,442,637 A * | 8/1995 | Nguyen | 714/708 |
| 5,592,483 A | 1/1997 | Hieda et al. | 370/85.3 |
| 5,802,041 A | 9/1998 | Waclawsky et al. | 370/245 |
| 5,903,724 A | 5/1999 | Takamoto et al. | 395/200.3 |
| 6,076,114 A | 6/2000 | Wesley | 709/235 |
| 6,275,471 B1 | 8/2001 | Bushmitch et al. | 370/248 |
| 6,701,372 B2 | 3/2004 | Yano et al. | 709/232 |
| 6,757,255 B1 * | 6/2004 | Aoki et al. | 370/252 |
| 6,831,908 B2 * | 12/2004 | Kikuchi | 370/338 |
| 7,146,417 B1 | 12/2006 | Coile et al. | |
| 7,164,680 B2 | 1/2007 | Loguinov | |
| 7,233,573 B2 | 6/2007 | Walls et al. | |
| 7,286,540 B2 * | 10/2007 | Kim et al. | 370/394 |
| 7,436,795 B2 * | 10/2008 | Jiang | 370/328 |
| 2001/0034788 A1 | 10/2001 | McTernan et al. | 709/232 |
| 2002/0114302 A1 | 8/2002 | McDonald et al. | 370/338 |
| 2002/0114304 A1 | 8/2002 | Hur et al. | 370/338 |
| 2002/0141370 A1 | 10/2002 | Abrol et al. | 370/338 |
| 2002/0154600 A1 | 10/2002 | Ido et al. | |
| 2002/0165973 A1 | 11/2002 | Ben-Yehezkel et al. | |
| 2002/0181506 A1 | 12/2002 | Loguinov | |
| 2002/0191594 A1 | 12/2002 | Itoh et al. | |
| 2003/0007454 A1 | 1/2003 | Shorey | 370/229 |
| 2003/0037158 A1 | 2/2003 | Yano et al. | 709/232 |
| 2003/0046032 A1 | 3/2003 | Puthiyedath | |

(Continued)

FOREIGN PATENT DOCUMENTS

EP 001263160 A1 12/2002

(Continued)

*Primary Examiner*—Ricky Ngo
*Assistant Examiner*—Chandrahas Patel
(74) *Attorney, Agent, or Firm*—John L. Rogitz

(57) ABSTRACT

A packetized data transmitter notes packet transmission times and the times, if any, of retransmission requests from a receiver. Based on the period between original transmission and retransmission of a dropped packet, the transmitter establishes a packet discard period, essentially a transmitter packet buffer length.

12 Claims, 5 Drawing Sheets

U.S. PATENT DOCUMENTS

| | | |
|---|---|---|
| 2003/0067872 A1 | 4/2003 | Harrell et al. ............... 370/229 |
| 2003/0086427 A1 | 5/2003 | Lee et al. |
| 2003/0120802 A1 | 6/2003 | Kohno |
| 2003/0145100 A1 | 7/2003 | Marchetto et al. ........... 709/233 |
| 2003/0191844 A1 | 10/2003 | Meyer et al. ................ 709/227 |
| 2004/0003107 A1 | 1/2004 | Barham et al. |
| 2004/0038645 A1 | 2/2004 | Rcunamaki et al. ........ 455/41.2 |
| 2004/0078624 A1 | 4/2004 | Maxemchuk et al. |
| 2004/0114565 A1 | 6/2004 | Sipola ....................... 370/349 |
| 2004/0174893 A1 | 9/2004 | Saito .......................... 370/420 |
| 2004/0193762 A1 | 9/2004 | Leon et al. ..................... 710/52 |
| 2004/0213287 A1 | 10/2004 | Komori et al. |
| 2006/0023673 A1 | 2/2006 | Read |
| 2006/0203760 A1 | 9/2006 | Fukui et al. |

FOREIGN PATENT DOCUMENTS

| | | |
|---|---|---|
| JP | 2000115233 A | 4/2000 |
| JP | 2000261496 A | 9/2000 |

\* cited by examiner

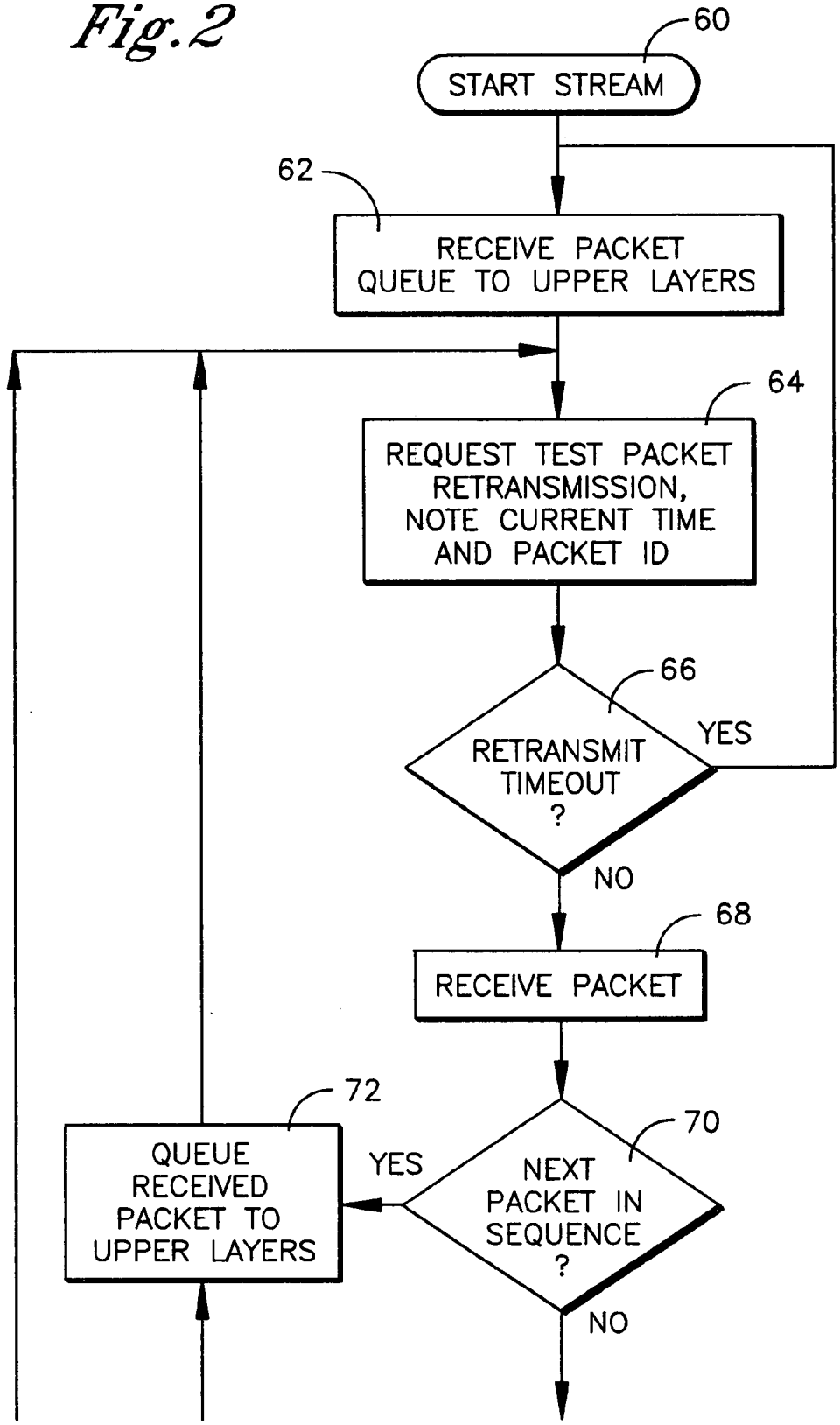

SYSTEM AND METHOD FOR DYNAMICALLY DETERMINING RETRANSMIT BUFFER TIME

This application is a continuation-in-part of and claims priority from co-pending U.S. patent application Ser. No. 10/903,171, filed Jul. 30, 2004.

I. FIELD OF THE INVENTION

The present invention relates generally to packetized data communication systems.

II. BACKGROUND

When transmitting data from a server to a computer system, or from a computer system to another computer system, it is not guaranteed that 100% of the data requested by the user will arrive. Often times some of the data is lost in the transmission or is never sent at all.

Accordingly, methods have been provided for verifying proper receipt of data and when, for instance, a packet in a packetized data stream is not received, for requesting retransmission. In these methods, a data verification layer in a communication protocol stack tracks the received packets and requests retransmission if a packet does not arrive as expected.

As recognized herein, current standards for tracking data often contain overhead and latency which is too high for certain data streaming environments, such as telephony. Nonetheless, a receiver must buffer data before sending it on to higher levels in the protocol stack while waiting for a retransmitted packet. Likewise, after sending data a transmitter must buffer it for a period after transmission, in case the receiver requests retransmission. The length of the transmitter buffer (sometimes referred to as a discard period) in current systems is predefined in an attempt to balance the need to wait long enough for a dropped packet to be requested and retransmitted, but to also avoid having to accumulate more packets post-transmission than is necessary. In terms of the transmitter buffer, a buffer length that is too long requires more memory than is necessary, while a buffer length that is too short means that the retransmission mechanism will not function. The present system is presented in response to the above critical observations.

SUMMARY OF THE INVENTION

A method for establishing a packet buffer length in a packetized data delivery system includes, upon initially receiving a packetized data stream, requesting retransmission of a received packet. The method also includes receiving a retransmitted copy of the packet. Based at least in part on the requesting and receiving acts, the buffer length is established.

If desired, an ID of the packet for which retransmission is requested and a time of retransmission request are recorded. Also, a time of receipt of the retransmitted copy is recorded, with the method then using the difference between the time of receipt of the retransmitted copy and the time of retransmission request to establish the buffer length. Preferably, the requesting, receiving, and establishing acts are executed substantially at the beginning of each new packetized data stream being transmitted. The buffer length may be used to delay sending packets to higher communication protocol levels in the event of a missed packet.

In another aspect, a packetized data receiver includes a receiver system that establishes a lower level in a packetized data communication protocol stack. The receiver system requests a retransmission of a received packet at or near the beginning of a packetized data stream being received by the receiver. The logic of the receiver system determines a time period measured from the time of requesting a retransmission until receipt of a retransmitted packet that correlates to the received packet. A buffer delay period is then established based on the time period. The buffer delay period is used in the event of a missing packet to buffer data before sending it to higher levels in the protocol stack.

In yet another aspect, a packetized data receiver establishes, for each packetized data stream received and substantially at the beginning of receiving each respective stream, a time delay to be used in the event that a packet is missed for sending packets to higher levels of a protocol stack.

In a transmitter embodiment, a method for establishing a packet discard period includes, upon initially transmitting at least one packet in a packetized data stream, recording a time of transmission of the packet. The method also includes receiving a request for a retransmitted copy of the packet, and retransmitting the packet. Based at least in part on the recording and retransmitting acts, the packet discard period is established.

In some embodiments a difference is used between the time of transmission and a time of retransmission to establish the packet discard period. The discard period can be executed substantially only at the beginning of each new packetized data stream being transmitted, or it can be executed for all retransmitted packets in a packetized data stream, or it can be executed periodically for some but not all retransmitted packets in a packetized data stream. The packetized data may be in user datagram protocol (UDP).

In another aspect, a packetized data transmitter executes logic that includes receiving, from a receiver at a request time, a request for retransmission of a packet that had already been transmitted at an original transmission time. The logic also includes determining a packet expiration period measured from the original transmission time to the request time and/or to a time of retransmitting the packet. Using the packet expiration period, it is determined whether to discard packets from a retransmission buffer in the transmitter.

In yet another aspect, a packetized data transmitter establishes, for each packetized data stream transmitted and substantially at the beginning of transmitting each respective stream, a packet expiration period to be used for determining whether previously transmitted packets should be discarded from a retransmission queue at the transmitter.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
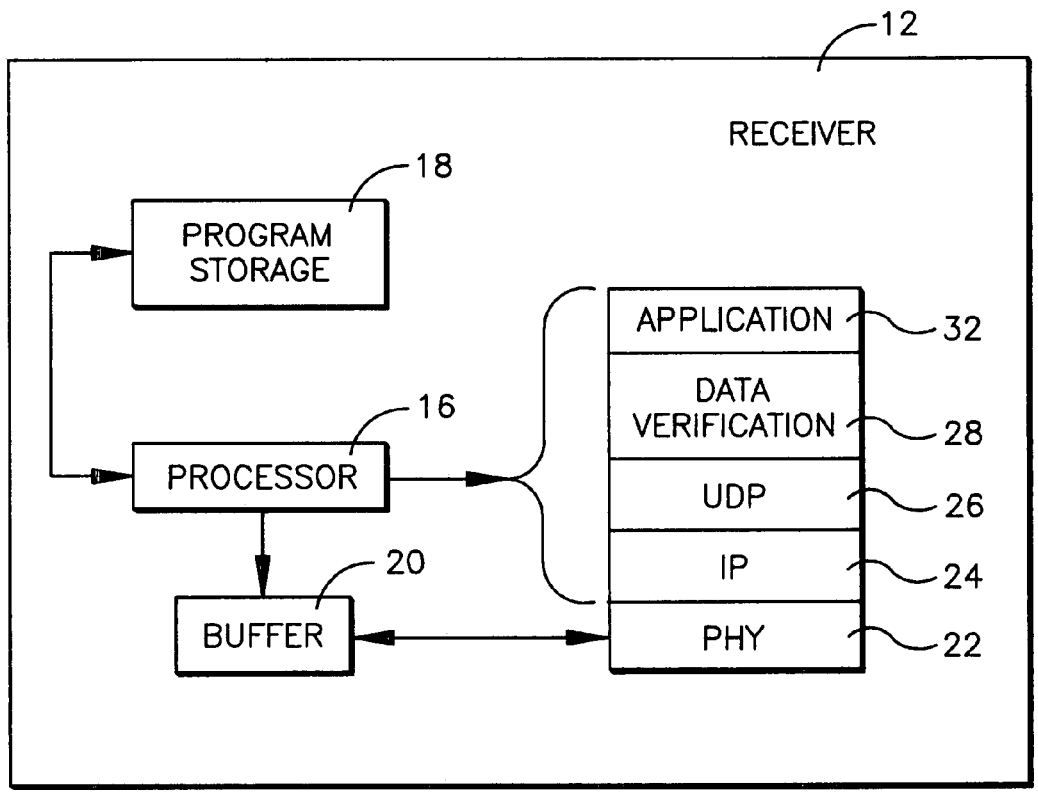
FIG. 1 is block diagram of the present system.
Figure 1:
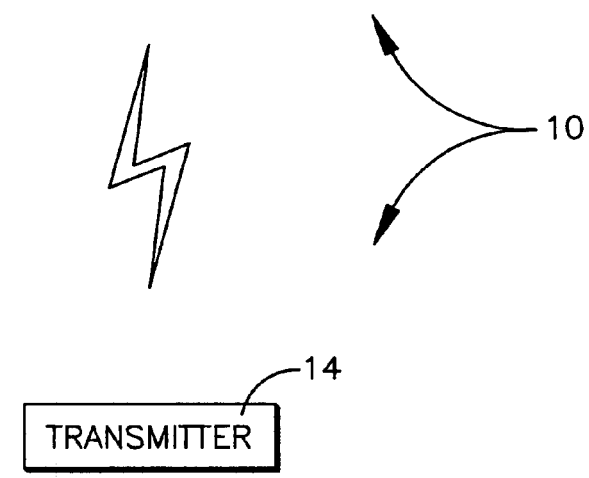

Referring initially to FIG. 1, a system is shown, generally designated 10, which includes receivers 12 and transmitters 14 exchanging information with each other. It is to be understood that FIG. 1 is illustrative only and is non-limiting. For instance, FIG. 1 shows an exemplary non-limiting protocol stack that in practice may include greater or fewer layers than shown. Also, FIG. 1 assumes that the protocol portion used to ensure correct data delivery is user datagram protocol (UDP) and that the data being exchanged is telephony data, but other data delivery correctness protocols may be used such as reliable UDP (R-UDP) and transmission control protocol (TCP) to ensure correct delivery of either or both telephony data and computer data. Thus, without limitation the receiver 12 and transmitter 14 may be nodes in a wired or wireless communication system, and may communicate over a local area network (LAN) in which variations in packet delivery times do not greatly vary, although communication can be over wide area networks (WAN) such as the Internet. In a non-limiting implementation the receiver 12 and transmitter 14 may be mobile telephones or computers or one or both might be a fixed asset such as a wireless communication system base station, fixed computer, or other communication device.

With the above in mind, the exemplary receiver 12 includes a processor 16 that can access a program storage device 18 to execute the logic shown below in FIG. 2. It is to be understood that the program storage device 18 is any suitable electronic storage medium including solid state storage, disk storage, removable storage, etc. It is to be further understood that the logic can be implemented in hardware if desired. Whether implemented in hardware or software, the present logic set forth below can be executed to establish the size of a retransmit buffer 20. By "size" of buffer is meant the length, in data elements, of the buffer, which can be directly correlated to and/or represented by the time data is delayed in the buffer.

FIG. 1 schematically shows that the receiver 12 processes data in a so-called protocol stack that includes several layers of protocols through which data is passed, up to the highest level where the data is used. In the exemplary non-limiting embodiment shown, the protocol stack of the receiver 12 can include a physical layer 22 which receives the transmitted signal from the transmitter 14. Data from the physical layer 22, including voice over internet protocol (VoIP) data, may be packetized into Internet Protocol (IP)-formatted data in an IP layer 24. Data from the IP layer 24 is then passed to a UDP layer 26 and thence to a data verification layer 28 to verify that all packets have been received. In the exemplary embodiment shown, the layer 26 uses UDP, it being understood that it may use other protocols including, without limitation, reliable UDP (R-UDP) and transmission control protocol (TCP). At the top of the protocol stack is an application layer 32, which represents the data in a format that is appropriate for the intended end use, e.g., audible display of a voice or data transformation and processing using an end-use software application.

Figure 2:
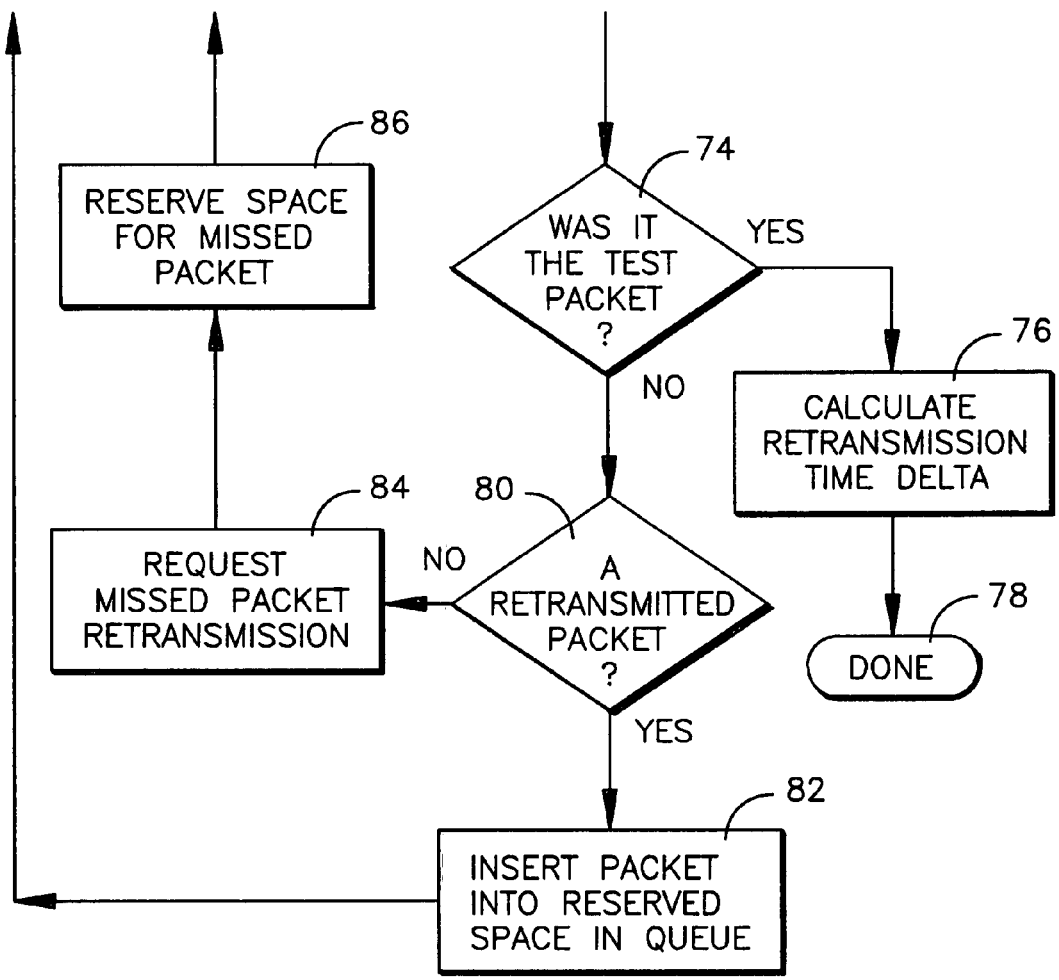
FIG. 2 is a flow chart of the present logic as undertaken by a receiver.

Now referring to FIG. 2, a diagram of the logic for establishing a buffer length is shown, with FIG. 2 being executed by the receiver 12 preferably at the start of each packetized stream transmission and, if desired, every time a retransmission is requested for, e.g., missing packets. First, at state 60 the data stream is initiated. Proceeding to block 62, the first packet in the stream is received and queued in, e.g., the buffer 20 shown in FIG. 1 for eventual passing to the upper layers of the protocol stack. After the first (or substantially the first) packet is received, at block 64 retransmission of the first packet, which may be thought of as a test packet, is requested of the transmitter to acquire a real-time measurement of retransmission delay and therefore to be able to dynamically establish the buffer size to accommodate the measured delay, as discussed further below. As indicated at block 64, the current time and packet ID of the test packet are also noted in order to acquire real time data.

Proceeding to decision diamond 66, it is determined whether the retransmit action has failed as indicated by an excessive period elapsing without receiving the retransmitted packet from the transmitter. If it has, the logic reverts back to block 62 and starts over again. If the action has not failed, a packet has been received and the logic proceeds to block 68.

Still referring to FIG. 2, once the packet is received at block 68, at decision diamond 70 it is determined whether the packet fits into the next slot in the total packet sequence (indicating that the packet received at block 68 was not out of sequence and hence was not the test packet). If it is the next packet in the sequence, the logic then moves to block 72 where the packet is placed in the queue (e.g., in the buffer 20 shown in FIG. 1) for eventual passing on to the upper layers of the protocol stack.

Should it be determined at decision diamond 70 that the packet received at block 68 is not the next one in sequence, the logic flows from decision diamond 70 to decision diamond 74, wherein it is determined, by means of comparing the ID of the packet received at block 68 with the packet ID recorded at block 64, whether the packet received was the test packet. If the logic determines that it was the test packet, the logic proceeds to block 76 wherein the time period between the time recorded at block 64 and the time the test packet was received at block 68 is determined. Because this period can be correlated to a buffer length by, e.g., multiplying the data rate by the measured retransmission delay period to find a total number of data elements that must be buffered during the retransmission delay period determined at block 76, the length of the buffer 20 shown in FIG. 1 can be calculated. Once this calculation has been completed, the logic concludes at state 78.

Returning to decision diamond 74, if the packet received at block 68 is not the test packet, the logic proceeds to decision diamond 80, wherein it is determined whether the packet is a retransmitted packet from a slot in the packet stream at which a packet was missed. If it was, the logic then flows to block 82 where the packet is inserted into its correct slot in the queue for subsequent passing on to the upper levels of the protocol stack.

In contrast, if, at decision diamond 80, the logic determines that the packet received is not a retransmitted packet but rather some other packet out of sequence, indicating that some packet or packets have been missed, the logic moves to block 84 where a request for the retransmission is made of the missed packet(s) (i.e., those preceding the packet received at block 68 that should have followed the latest packet before that in the buffer). After the request has been made, a space in the data stream for the missed packet is reserved at block 86, and then the logic moves to block 72 to function as set forth above.

Now referring to FIG. 3, a system is shown, generally designated 110, which illustrates details of a transmitter 112 that can execute the logic described below in reference to FIG. 4. It is to be understood that both the receiver 12 shown in FIG. 1 may execute the logic shown in FIG. 2, and/or the transmitter 112 shown in FIG. 3 may execute the logic shown in FIG. 4.

Figure 3:
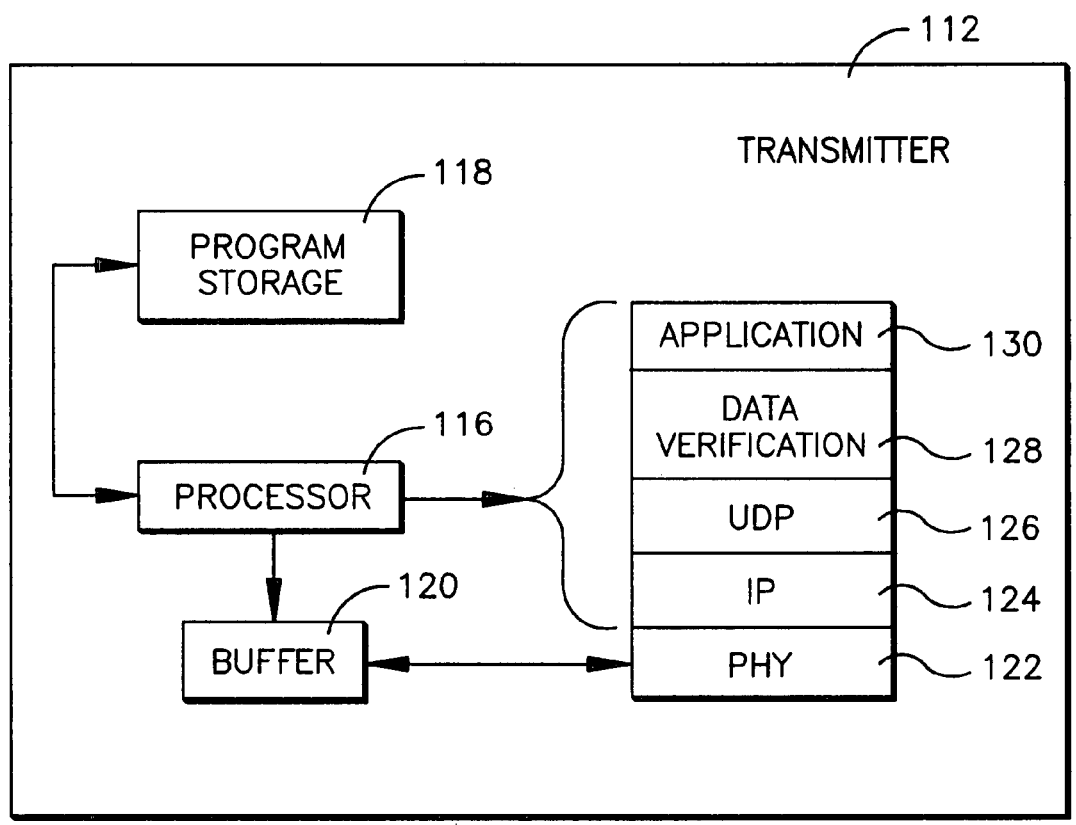
FIG. 3 is a block diagram of a system showing details of the transmitter.
Figure 3:
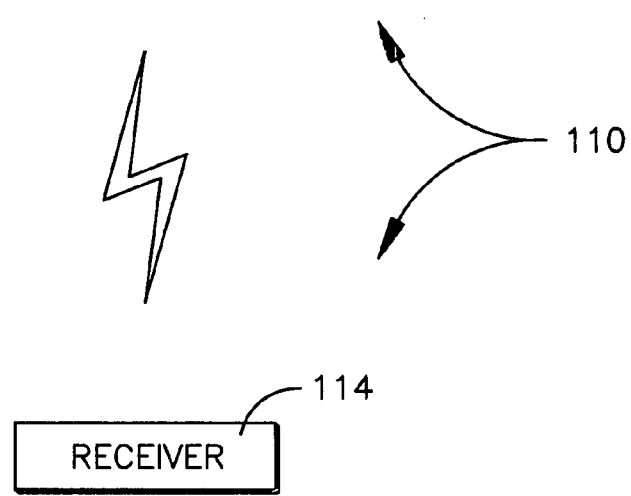

The transmitter 112 shown in FIG. 3 thus may communicate with a receiver 114 that in all essential respects may be identical to the receiver 12 shown in FIG. 1. The transmitter 112 thus may be a mirror image of the previously described receiver. With more specificity, the transmitter 112 may include a processor 116 that can access a program storage device 118 to execute the logic shown in FIG. 4. It is to be understood that the program storage device 118 is any suitable electronic storage medium including solid state storage, disk storage, removable storage, etc. It is to be further understood that the logic can be implemented in hardware if desired. Whether implemented in hardware or software, the present logic set forth below can be executed to establish the size of a retransmit buffer 120. By "size" of buffer is meant the length, in data elements, of the buffer, which can be directly correlated to and/or represented by the time data is delayed in the buffer before discarding.

FIG. 3 schematically shows that the transmitter 112 processes data in a so-called protocol stack that includes several layers of protocols through which data is passed, up to the highest level where the data is used. In the exemplary non-limiting embodiment shown, the protocol stack of the transmitter 112 can include a physical layer 122 which sends the data to be transmitted to the receiver 114. The physical layer 122 receives data, including voice over internet protocol (VoIP) data that may be packetized in Internet Protocol (IP)-formatted data from an IP layer 124. Data from the IP layer 124 in turn is received from a UDP layer 126, which accepts data from a data verification layer 128. In the exemplary embodiment shown, the layer 126 uses UDP, it being understood that it may use other protocols including, without limitation, reliable UDP (R-UDP) and transmission control protocol (TCP). At the top of the protocol stack, from which data originates, is an application layer 130, which represents the data in a format that is appropriate for the intended end use at the receiver 114, e.g., audible display of a voice or data transformation and processing using an end-use software application.

Figure 4:
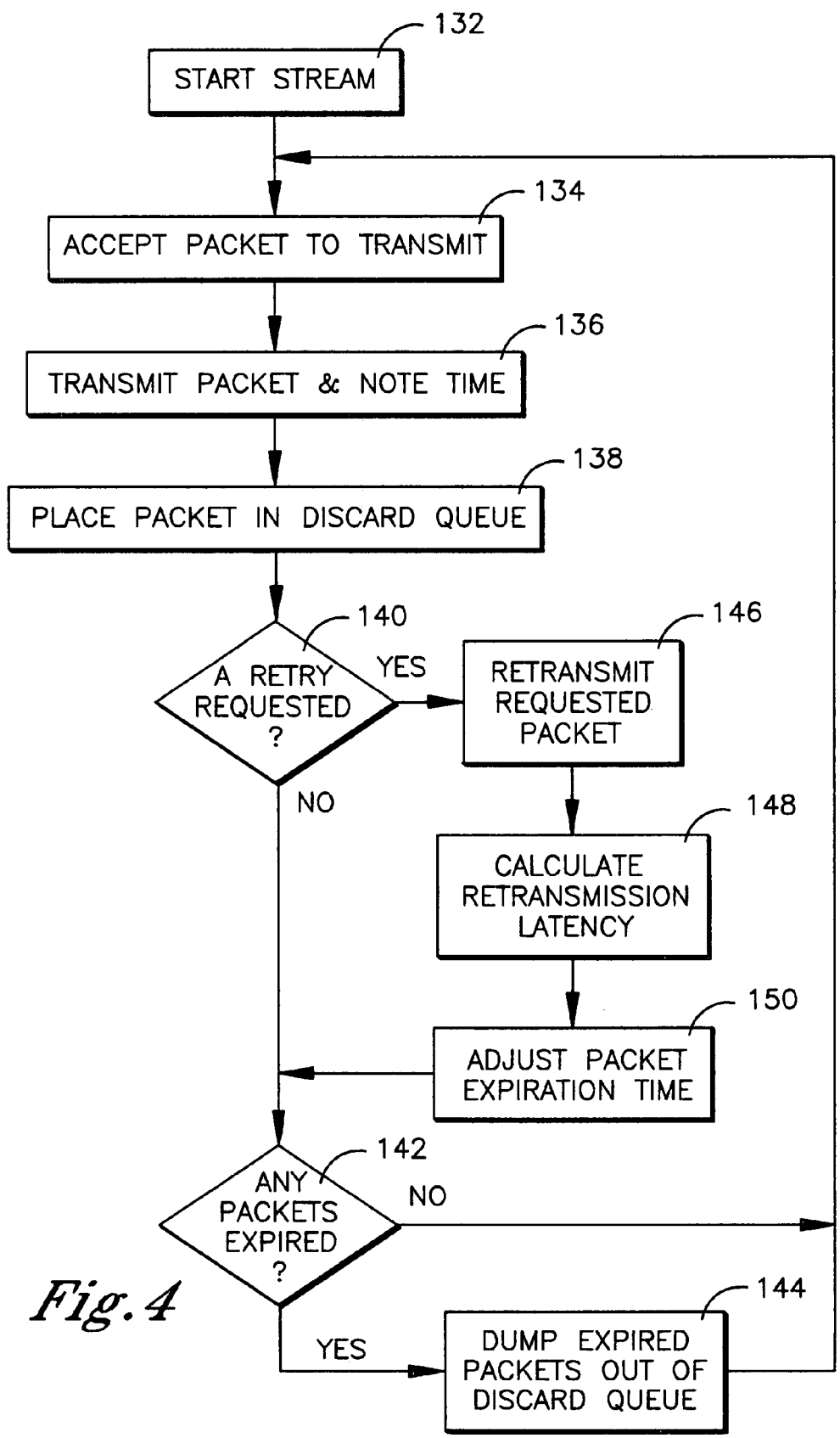
FIG. 4 is a flow chart of the present logic as undertaken by a transmitter.

Now referring to FIG. 4, a diagram of the logic for establishing a buffer length at the transmitter 112 is shown, with FIG. 4 being executed by the transmitter 112 preferably at the start of each packetized stream transmission and, if desired, every time a retransmission is requested for, e.g., missing packets. The logic starts at state 132. Proceeding to block 134, the next packet from the stack is accepted for transmission. Initially, the first packet in a stream to be transmitted is the "next" packet. At block 136 the packet is transmitted and the time of its transmission is recorded. The packet is then placed in a discard queue in the buffer 120 for subsequent discarding after the elapse of the transmitter buffer expiration period determined herein.

Moving to decision diamond 140, the transmitter 112 determines whether it has received a request from the receiver 114 to retransmit a packet. If not, the logic proceeds to decision diamond 142 to determine whether any packets in the discard queue have expired by, e.g., comparing their times of transmission with the below-established expiration period. In the first iteration (i.e., for the first packet) the test at decision diamond 142 should be negative, in which case the logic loops back to block 134 as shown to retrieve the next packet in the stream for transmission. In the event that expired packets exists in the discard queue at decision diamond 142, the packet(s) are discarded, e.g., flushed from the buffer 120, at block 144.

In the event that a retransmission request is received by the transmitter 112 at decision diamond 140, FIG. 4 shows that the logic moves to block 146 to retransmit the requested packet(s). At block 148, the actual retransmission latency is calculated. In one implementation this is done by obtaining the difference in time, i.e., the period between, the time the dropped packet (identified by its packet ID) was first transmitted, and the time the requested packet of the same packet ID is retransmitted. Or, the expiration period may be calculated by obtaining the difference in time between the time the dropped packet was first transmitted, and the time the retransmission request is received.

Block 150 indicates that the transmitter buffer length, i.e., the packet expiration period used at decision diamond 142, may be adjusted using the calculation at block 150. The adjustment may include simply resetting the expiration period to the period most recently obtained at block 150, or it may include averaging the period obtained at block 150 with previous periods such that the expiration period used at decision diamond 142 represents an average of measured retransmission periods. If desired, the steps at blocks 148 and 150 may be performed only once, e.g., for the first packet transmitted in a stream, or they may be performed for each retransmitted packet as shown, or for only some packets on a periodic basis. In any case, the amount of data kept in the buffer 120 is dynamically established for each stream transmitted.

While the particular SYSTEM AND METHOD FOR DYNAMICALLY DETERMINING RETRANSMIT BUFFER TIME as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A packetized data transmitter dynamically establishing, for each packetized data stream during transmission of the stream, a packet expiration period to be used for determining whether previously transmitted packets should be discarded from a retransmission queue at the transmitter by flushing the queue, wherein the transmitter determines whether it has received a request from a receiver to retransmit a packet and if so, retransmits the requested packet and revises the packet expiration period at least in part by determining a difference between a time the packet as identified by its packet ID was first transmitted to the receiver, and a time the packet of the same packet ID is retransmitted, and/or by determining a difference between a time the packet was first transmitted, and a time the request to retransmit is received by the transmitter.

2. The transmitter of claim 1, wherein the transmitter is a user datagram protocol (UDP) transmitter.

3. The transmitter of claim 1, wherein the transmitter executes the establishing act substantially only at the beginning of each new packetized data stream being transmitted.

4. The transmitter of claim 1, wherein the transmitter executes the establishing act for all retransmitted packets in a packetized data stream.

5. The transmitter of claim 1, wherein the transmitter executes the establishing act periodically for some but not all retransmitted packets in a packetized data stream.

6. The transmitter of claim 1, comprising averaging the expiration period with previous expiration periods to render an averaged period that is used to determine when to flush the queue.

7. A packetized data transmitter, comprising:
a processor executing logic including:
receiving, from a receiver at a request time, a request for retransmission of a packet transmitted at an original transmission time;
retransmitting the packet in response to the request;
in response to the request, determining a packet expiration period at least in part by measuring a period from the original transmission time of the packet to at least one time in the group of times consisting of: the request time, and a time of retransmitting the packet; and
using the packet expiration period to determine whether to discard packets from retransmission buffer in the transmitter by flushing the packets from the buffer.

8. The transmitter of claim 7, comprising averaging the expiration period with previous expiration periods to render an averaged period that is used to determine when to flush the buffer.

9. The transmitter of claim 7, wherein the transmitter is a user datagram protocol (UDP) transmitter.

10. The transmitter of claim 7, wherein the logic executes the determining act substantially only at the beginning of each new packetized data stream being transmitted.

11. The transmitter of claim 7, wherein the logic executes the determining act for all retransmitted packets in a packetized data stream.

12. The transmitter of claim 7, wherein the logic executes the determining act periodically for some but not all retransmitted packets in a packetized data stream.

* * * * *